United States Patent [19]
Cushman et al.

[11] 3,919,149
[45] Nov. 11, 1975

[54] WAX EMULSIONS
[75] Inventors: Donald R. Cushman, Wenonah; John W. Schick, Cherry Hill, both of N.J.
[73] Assignee: Mobil Oil Corporation, New York, N.Y.
[22] Filed: Apr. 26, 1974
[21] Appl. No.: 464,717

[52] U.S. Cl. .............. 260/28.5 AV; 117/155 UA; 260/28.5 R
[51] Int. Cl.² .................................. C08L 91/00
[58] Field of Search ......... 260/28.5 R, 28.5 AV; 117/155 UA

[56] References Cited
UNITED STATES PATENTS
3,741,925  6/1973  McDonald ............ 260/28.5 R
3,756,973  9/1973  Stahl ................... 260/28.5 R Primary Examiner—Melvyn I. Marquis
Attorney, Agent, or Firm—Charles A. Huggett; Raymond W. Barclay; Benjamin I. Kaufman

[57] ABSTRACT

Aqueous wax emulsions containing a minor amount of a copolymer of ethylene and acrylic acid, a minor amount of an emulsifier, and water in an amount sufficient to form the emulsion.

8 Claims, No Drawings

WAX EMULSIONS

BACKGROUND OF THE INVENTION

1. Field of the Invention

This invention relates to wax emulsion compositions and, in one of its aspects, relates more specifically to aqueous wax emulsions particularly suitable for use in internal sizing of photographic paper, and other cellulosic materials, for providing resistance to water, acids, alkali and alcoholic media.

2. Description of the Prior Art

Prior to the present invention, photographic paper and other cellulosic materials, have been internally sized to provide resistance to water and other liquids such as acids, alkali and alcohols. The most conventionally employed sizing agent comprises sodium stearate, which is precipitated by aluminum salts to form aluminum stearate, prior to sheet formation. Although good water resistance has been obtained by such procedure, resistance to acids such as acetic acid, alkali and alcohol has been found to be only fair, and therefore, improvement in such regard is found to be highly desirable. The use of wax emulsions has also been carried out experimentally and, here also, only fair resistance to acid, alkali or alcohol media have been obtained.

SUMMARY OF THE INVENTION

It has now been found that aqueous wax emulsions can be provided which are suitable for use in internal sizing of photographic paper and other cellulosic materials, by incorporating in the wax emulsions minor amounts of a copolymer of ethylene and acrylic acid. In general, as more fully hereinafter described, the novel aqueous wax emulsions of the present invention contain a minor amount of a copolymer of ethylene and acrylic acid, a minor amount of an emulsifier and water in an amount sufficient to form the emulsion.

In its more specific aspects, the novel aqueous wax emulsion of the present invention, for most uses, comprises from about 30% to about 60%, and preferably from about 40% to about 50%, by weight, of a paraffin wax; from about 0.2% to about 10%, and preferably from about 1% to about 5%, by weight of a copolymer of ethylene and acrylic acid; from about 2% to about 10%, and preferably from about 3% to about 6%, of an emulsifier; and water in an amount sufficient to form the emulsion.

The wax component of the emulsion may comprise any paraffin wax obtained from petroleum oil. These waxes may comprise high molecular weight hydrocarbons comprising generally, straight-chain compounds having a crystalline structure in solid form. Preferably, the paraffin wax has a melting point from about 120° to about 175°F.

The copolymer of ethylene and acrylic acid is comercially available. This copolymer has a hardness (ASTM D-5) from about 1 to about 5; a viscosity-cps 284°F. (Brookfield) from about 350 to about 800; and an acid No. from about 30 to about 90.

The emulsifier employed in the novel wax emulsion may be of the non-ionic type, anionic type or cationic type. The emulsifier may also include emulsifiers of the non-ionic type in combination with the emulsifier of the anionic type. Furthermore, emulsifiers may be employed which are combinations of the non-ionic and cationic types. Many non-ionic emulsifiers can be employed in the emulsion, provided the critical relationship between oil solubility and water solubility is maintained. Typical of such emulsifiers are mixtures of sorbitan monostearate and polyoxyethylene sorbitan monooleate. Typical other non-ionic emulsifiers suitable for use in the wax emulsion are polyoxyethylene ethers and octyl or nonyl phenol having variable amounts of ethylene oxide content per mole of finished product required to provide oil and water solubility characteristics. Emulsifiers of the anionic type may include soaps of fatty acids and alkanolamines. In addition, such anionic emulsifiers as lignin sulfonates, naphthalene sulfonates and protective colloids such as natural gums; gelatin and the like may also be employed. Particularly preferred are emulsifiers comprising non-ionic and anionic type emulsifiers. Representative of the cationic emulsifiers are amine acetates, and in this respect, cationic emulsifiers may also be employed in combination with the aforementioned non-ionic emulsifiers.

The novel wax emulsions of the present invention, although particularly advantageously employed in the internal sizing of photographic papers to make them resistant to water, acid, alkali and alcoholic media, may also be employed for such purpose in treating other cellulosic materials such as cotton cloth, cotton tapes, pressboard, wood and similar materials. The wax emulsions may be incorporated in the cellulosic material in any desired amount. In many applications, the emulsions may be employed in such amounts that the emulsion solids imposed on the dry fiber range from about 0.2% to about 5% and, preferably, from about 1.0% to about 1.5% of the total weight of the fiber.

DESCRIPTION OF SPECIFIC EMBODIMENTS

The following comparative data and examples will serve to illustrate the effect of the novel wax emulsions of the present invention as internal sizing agents for cellulosic materials. The following Table I is intended to illustrate the use of both copolymers of ethylene and acrylic acid and also polymeric materials as internal sizing agents for paper and respective performance data obtained, as measured by the Cobb Test.

The Cobb Test serves to measure the resistance of the paper against 60%, by weight, of acetic acid. In this test, 100cc of the 60% acetic acid contacts one side of a weighed test sheet (sized in laboratory equipment with 1.5%, by weight, solids of the experimental sizing agent) for a period of 60 seconds. The acid is then poured off, excess acid is blotted off, and the sheet reweighed to determine the weight of acetic acid retained. This weight is multiplied by a factor to show grams of acid retained per square meter surface area of paper contacted.

In Table I, copolymer (1) (ethylene/acrylic acid) had a softening point (ASTM E-28) of 215°F.; a hardness dmm (ASTM D-5) of 4.0; a density g/cc (ASTM D-1505) of 0.93; a viscosity-cps 284°F. (Brookfield) of 650; and an acid no. of 75. Polymer (2) comprised oxidized polyethylene having a softening point (ASTM E-28) of 219°F. a hardness (ASTM D-5) of 5.5; a density g/cc (ASTM D-1505) of 0.93; viscosity-cps 284°F. (Brookfield) of 200; and an acid no. of 15. Polymer (3) comprised oxidized polyethylene having a softening point (ASTM E-28) of 205°F.; a hardness (ASTM D-5) of 12; a density g/cc (ASTM D-1505) of 0.92; viscosity-cps 284°F. (Brookfield) of 120; and an acid no. of 15. Polymer (4) comprised oxidized polyethylene having a softening point (ASTM E-28) of 230°F.; a hardness (ASTM D-5) of 1.5; a density g/cc (ASTM D-1505) of 0.94; viscosity-cps 284°F. (Brookfield) of 250, and an acid no. of 16. The non-ionic emulsifier comprised a mixture of 0.8%, by weight, of sorbitan monostearate and 0.8%, by weight, of polyoxyethylene sorbitan monooleate. The anionic emulsifier comprised the soap produced by reacting a mixture of fatty acids in an amount of 1.27%, by weight, comprising a major proportion of arachidic and behenic acids and 0.57%, by weight, of diethanolamine.

Table I

| SIZING AGENTS AND PERFORMANCE | | | | | |
|---|---|---|---|---|---|
| | Ex. 1 | Ex. 2 | Ex. 3 | Ex. 4 | Ex. 5 |
| 133/135 AMP Refined Paraffin Wax | 41.0 | 41.0 | 41.0 | 41.0 | 41.0 |
| Micro Crystalline Wax | 4.0 | 3.0 | 3.0 | 3.0 | 3.0 |
| Copolymer (1) | | 1.0 | | | |
| Polymer (2) | | | 1.0 | | |
| Polymer (3) | | | | 1.0 | |
| Polymer (4) | | | | | 1.0 |
| Non-ionic emulsifier | 1.6 | 1.6 | 1.6 | 1.6 | 1.6 |
| Anionic emulsifier | 1.3 | 1.3 | 1.3 | 1.3 | 1.3 |
| Water | 52.1 | 52.1 | 52.1 | 52.1 | 52.1 |
| Performance (in paper sized with 1.5% solids from each of above). Cobb Test,60% acetic acid grams picked up per sq. meter | 45.8 | 18.3 | 43.2 | 28.1 | 27.8 |

As will be apparent from the foregoing Table 1, the wax emulsion containing the aforementioned ethylene/acrylic acid copolymer exhibited a performance value of 18.3 contrasted with poor performance values when oxidized polyethylenes were substituted therefor.

In the following Table II, are shown the results obtained employing higher melting waxes, in which the resistance of the paper against 60%, by weight, of acetic acid are measured by the Cobb Test, as in Table I. In the examples of Table II, the same copolymer of ethylene and acrylic acid was employed as well as the same non-ionic and anionic emulsifiers of Table I. All parts of the components of Table II, as in Table I, are expressed in weight percent.

Table II

| SIZING AGENTS AND PERFORMANCE | | | | |
|---|---|---|---|---|
| | Ex. 1 | Ex. 2 | Ex. 3 | Ex. 4 Sodium Stearate |
| 143/145 AMP Paraffin | 45.0 | | | — |
| 150° AMP Paraffin | | 45.0 | 44.0 | — |
| Copolymer (1) | | | 1.0 | — |
| Non-ionic Emulsifier | 1.6 | 1.6 | 1.6 | — |
| Anionic Emulsifier | 1.3 | 1.7 | 1.7 | — |
| Water | 52.1 | 51.7 | 51.7 | — |
| Performance (in paper sized with 1.5% solids from above) Cobb Test, 60% acetic acid grams picked up/sq. meter | 17.7 | 16.7 | 14.6 | 40.0 |

As will be apparent from the foregoing Table II, the wax emulsion containing the aforementioned ethylene/acrylic copolymer exhibited a performance value of 14.6, contrasted with poor performance values when the copolymer was omitted from the wax emulsion. It will also be noted from Table II that sodium stearate, as a sizing agent, had the least resistance to acetic acid.

In the following Table III is shown a comparison between the effect of employing an emulsion containing copolymers of ethylene and acrylic acid as sizing agents and sodium stearate, as a conventional sizing agent. In obtaining the comparative data of Table III, the Fotosize Test was employed, which comprises an accurate means for measuring penetration into a sized sheet. A mixture of 60%, by weight, of glacial acetic acid and 40%, by weight, of ink is placed in a ring on top of the test sheet which is illuminated from below. Reflectance from below is measured with a photocell, and the time is automatically measured until the ink penetrates the sheet resulting in a reflectance low enough to stop the timer. The time, in seconds, is indicated corresponding to a definite degree of penetration of ink. As shown in Table III, the wax emulsion of Example 3 of Table II, containing the aforementioned ethylene/acrylic acid copolymer in the wax emulsion was greatly superior to sodium stearate as a sizing agent.

Table III

| COMPARISON OF SIZED PAPER (1.5% SIZING) USING FOTOSIZE TEST FOR ACID RESISTANCE | |
|---|---|
| Ex. 3 of II | Sodium Stearate |
| Fotosize Test, 60% acetic acid Time in seconds for acid to penetrate sheet | |
| 796 | 203 |

The following Table IV discloses results obtained by carrying out sizing tests from paper made on an experimental paper machine, comprising a small scale replica of a commercial paper machine. As is shown in Table IV, the laboratory results obtained are indicative that the blend of wax and the aforementioned ethylene/acrylic acid copolymers produced the most desirable results.

Table IV

| EXPERIMENTAL PAPER MACHINE SIZING RESULTS | | | |
|---|---|---|---|
| | Ex. 1 of Table II | Ex. 2 of Table II | Ex. 3 of Table II |
| Wax melt pt. °F. | 143/145 | 150 | 150 |
| *Copolymer | — | — | *Copolymer (1 of Table II) |
| **Fotosize Test, seconds | 79 | 128 | 143 |

*1.0% of emulsion
**Paper sized with 1.5% sizing solids, time in seconds to penetrate sheet.

As will be noted from the foregoing disclosure and data obtained, aqueous wax emulsions can be prepared which are suitable for use in internal sizing of photographic paper and other cellulosic materials by incorporating in the wax emulsion minor amounts of a copolymer of ethylene acrylic acid. Although the present invention has been described herein by means of certain specific embodiments and illustrative examples, it is not intended that the scope thereof be limited in any way and is capable of various modifications and adaptations as those skilled in the art will readily appreciate.

We claim:

1. An aqueous wax emulsion containing from about 30% to about 60%, by weight, paraffin wax; from about 0.2% to 10% of a copolymer of ethylene and acrylic acid having a hardness (ASTM D-5) from about 1 to about 5, a viscosity - cps. (Brookfield) from about 350 to about 800, and an acid No. from about 30 to about 90; a minor amount of an emulsifier; and water in an amount sufficient to form the emulsion.

2. The emulsion of claim 1 wherein said emulsion comprises, by weight, from about 2% to about 10% emulsifier, and water in an amount sufficient to form the emulsion.

3. The emulsion of claim 1 wherein said emulsion comprises, by weight, from about 40% to about 50% paraffin wax, from about 1% to about 5% of the copolymer of ethylene and acrylic acid, from about 3% to about 6% emulsifier and water in an amount sufficient to form the emulsion.

4. The emulsion of claim 1 wherein the paraffin wax has a melting point from about 120°F. to about 175°F.

5. The emulsion of claim 1 wherein the copolymer has a softening point (ASTM E-28) from about 200°F. to about 250°F.

6. The emulsion of claim 1 wherein the emulsifier is a non-ionic emulsifier comprising a mixture of sorbitan monostearate and polyoxyethylene sorbitan monooleate.

7. The emulsion of claim 1 wherein the emulsifier is an anionic emulsifier comprising a soap obtained by the reaction of a fatty acid and an alkanolamine.

8. The emulsion of claim 1 wherein the emulsifier is a cationic emulsifier comprising an amine acetate.

* * * * *